(12) United States Patent
Boroda et al.

(10) Patent No.: US 12,012,708 B2
(45) Date of Patent: Jun. 18, 2024

(54) FLOATING BREAKWATER STRUCTURE

(71) Applicant: ELTA SYSTEMS LTD., Ashdod (IL)

(72) Inventors: Vladimir Boroda, Ashdod (IL); Feri Tayouri, Ashdod (IL); Gregory Geyshis, Ramat Gan (IL)

(73) Assignee: ELTA SYSTEMS LTD., Ashdod (IL)

( * ) Notice: Subject to any disclaimer, the term of this patent is extended or adjusted under 35 U.S.C. 154(b) by 203 days.

(21) Appl. No.: 17/612,317

(22) PCT Filed: May 18, 2020

(86) PCT No.: PCT/IL2020/050540
§ 371 (c)(1),
(2) Date: Nov. 18, 2021

(87) PCT Pub. No.: WO2020/250212
PCT Pub. Date: Dec. 17, 2020

(65) Prior Publication Data
US 2022/0242528 A1    Aug. 4, 2022

(30) Foreign Application Priority Data

Jun. 11, 2019 (IL) .......................................... 267357

(51) Int. Cl.
*E02B 3/06* (2006.01)
*B63B 21/50* (2006.01)
(Continued)

(52) U.S. Cl.
CPC .............. *E02B 3/062* (2013.01); *B63B 21/50* (2013.01); *E02B 9/08* (2013.01); *F03B 13/18* (2013.01)

(58) Field of Classification Search
CPC . E02B 3/06; E02B 3/062; E02B 3/064; E02B 9/08; B63B 21/50; F03B 13/18
(Continued)

(56) References Cited

U.S. PATENT DOCUMENTS 3,465,528 A * 9/1969 Usab ....................... E02B 3/062
                                                                405/27
3,534,558 A * 10/1970 Le Bouteiller ......... E02B 3/062
                                                                405/26

(Continued)

FOREIGN PATENT DOCUMENTS

CH        598426 A5    4/1978
CN     201762686 U    3/2011
(Continued)

OTHER PUBLICATIONS

International Search Report and Written Opinion for International Application No. PCT/IL2020/050540 dated Jul. 13, 2020.
(Continued)

*Primary Examiner* — Frederick L Lagman
(74) *Attorney, Agent, or Firm* — Dorsey & Whitney LLP

(57) ABSTRACT

A floating breakwater structure is described. The structure includes a floating platform disposed at a water surface and a mooring system. The floating platform has one long side for facing a shore and another long side for facing a sea-horizon. The mooring system includes at least one pair of side anchors located on the seabed at one long side of the buoyancy platform, and at least one another pair of side anchors located on the seabed at the other long side of the floating platform. The mooring system also includes at least two pairs of crossing mooring spring-lines linked at one end to the floating platform. Each pair of the crossing mooring spring-lines is linked at one end to the corresponding long side of the of the floating platform and at another end to the corresponding pair of the side anchors.

13 Claims, 3 Drawing Sheets

(51) Int. Cl.
*E02B 9/08* (2006.01)
*F03B 13/18* (2006.01)

(58) Field of Classification Search
USPC .............................................. 405/26, 27, 28
See application file for complete search history.

(56) References Cited

U.S. PATENT DOCUMENTS

| | | | | |
|---|---|---|---|---|
| 3,877,233 | A * | 4/1975 | Olsen | E02B 3/062 405/27 |
| 3,969,901 | A * | 7/1976 | Matsudaira | E02B 3/062 405/23 |
| 4,693,631 | A * | 9/1987 | McKay | E02B 3/062 405/21 |
| 4,997,310 | A * | 3/1991 | Rasmussen | E02B 3/062 405/21 |
| 6,102,616 | A * | 8/2000 | Foote | E02B 3/062 405/23 |
| 6,443,653 | B1 * | 9/2002 | Zingale | F03B 13/142 60/497 |
| 11,697,912 | B2 * | 7/2023 | Li | E02B 9/08 405/27 |
| 2004/0018056 | A1 * | 1/2004 | Wittenberg | E02B 3/062 405/63 |
| 2010/0278630 | A1 | 11/2010 | Yamamoto et al. | |
| 2011/0002739 | A1 * | 1/2011 | Howland | B63B 35/44 14/27 |
| 2015/0259869 | A1 * | 9/2015 | Atilano | E02B 3/062 405/26 |
| 2016/0053454 | A1 * | 2/2016 | Neelamani | E02B 3/062 405/26 |

FOREIGN PATENT DOCUMENTS

| | | | | |
|---|---|---|---|---|
| CN | 102535393 | A | | 7/2012 |
| CN | 202971027 | U | | 6/2013 |
| CN | 107859589 | A | | 3/2018 |
| CN | 108119295 | A | | 6/2018 |
| CN | 106522158 | B | | 9/2018 |
| CN | 208455565 | U | | 2/2019 |
| CN | 109703705 | A | | 5/2019 |
| CN | 110541783 | A * | 12/2019 | |
| CN | 111120192 | A * | 5/2020 | |
| CN | 111926768 | A * | 11/2020 | ............ E02B 3/062 |
| DE | 102005017040 | A1 | | 11/2006 |
| EP | 3237277 | A1 | | 11/2017 |
| ES | 2275678 | T3 | | 6/2007 |
| ES | 2338974 | A1 | | 5/2010 |
| IL | 256290 | | | 6/2018 |
| JP | S56101078 | A | | 8/1981 |
| JP | H0299488 | A | | 4/1990 |
| JP | H04146887 | A | | 5/1992 |
| JP | H0538022 | U | | 5/1993 |
| JP | H07247528 | A | | 9/1995 |
| JP | H08189282 | A | | 7/1996 |
| JP | H08246431 | A | | 9/1996 |
| JP | 2004300800 | A | | 10/2004 |
| JP | 2015214299 | A | | 12/2015 |
| WO | 2015065304 | A1 | | 5/2015 |
| WO | 2019028541 | A1 | | 2/2019 |

OTHER PUBLICATIONS

"Design Manual: Harbor and Coastal Facilities U.S. Naval Facilities Engineering Command", Jul. 1968, 3 pages.

* cited by examiner

FLOATING BREAKWATER STRUCTURE

TECHNOLOGICAL FIELD

This invention relates generally to offshore floating platforms, and more particularly to stabilize floating breakwater structures built/assembled offshore to protect the shoreline.

BACKGROUND

Breakwaters are artificial offshore structures constructed offshore near certain coastal areas for reducing incoming wave energy so as to protect a harbor, anchorage, marina basin and/or beaches from the effect of water wave attacks. Breakwaters can also protect the shoreline from erosion and longshore drift. The protection is achieved by reduction of wave energy through dissipating and/or reflecting whole or a part of the wave energy.

There are many different types of breakwaters. In general, breakwater structures are divided into two groups, such as "fixed" breakwaters and "floating" breakwaters.

The rubble mound breakwaters, which are famous and widely used in the world fixed coastal defense structures, is an example of fixed breakwaters. These permanent breakwater structures are built on the seabed from natural rocks and concrete or concrete armor units. Such breakwaters can be constructed with one end linked to the shore or be built offshore 100-600 meters from the original shoreline.

In many locations floating breakwaters represent a cost-effective alternative to permanent breakwaters. It is also typically easier to obtain permits for a floating breakwater structure than for a permanent structure built on the seabed. Floating breakwaters have been increasingly used aiming at protecting small craft harbors or marinas. Floating breakwaters are usually moored with chains, sinkers and anchors.

There are several conditions in favor of floating breakwaters, when compared to fixed breakwaters. In particular, floating breakwaters might be a proper solution where poor foundations possibilities prohibit the application of bottom supported breakwaters. In deep water, bottom connected breakwaters are often more expensive than floating breakwaters. Floating breakwaters present a minimum interference with water circulation and fish migration. Floating breakwaters can be removed and towed to protected areas if ice formation is a problem. They may be suitable for areas where anchorage or moorage is required. Floating breakwaters usually have a low profile and present a minimum intrusion on the horizon, particularly for areas with high tide ranges. Floating breakwaters can usually be rearranged into a new layout with minimum effort.

GENERAL DESCRIPTION

Conventional floating breakwaters are typically "passive" structures designed to withstand attacks of incoming waves by breaking the waves and decreasing wave height. There is still a need in the art to provide a novel floating breakwater structure that can include a mechanism for "active" operation to break strong waves.

According to an embodiment of the present invention, the floating breakwater structure includes a floating platform disposed at a water surface and configured for being mounted offshore at a predetermined distance from a shoreline. When mounted for operation, the buoyancy platform has one long side facing a shore and another long side facing a sea-horizon.

The floating breakwater structure also includes a mooring system and a damping system.

According to some embodiments of the present invention, the mooring system includes one or more pairs of side anchors located on the seabed at one long side of the buoyancy platform, and one or more other pairs of side anchors located on the seabed at another long side of the buoyancy platform.

The mooring system also includes two or more pairs of crossing mooring spring-lines linked to the floating platform. Each pair of the crossing mooring spring-lines is linked to the correspondingly long side of the floating platform and to the corresponding pair of side anchors, thereby anchoring the floating breakwater structure to the seabed.

According to some embodiments of the present invention, the damping system is arranged at the anterior long side of the floating platform (i.e., at the long side facing the horizon/deep-water) and configured for breaking water waves in order to stabilize a horizontal position of the floating breakwater structure on the water, and to absorb the wave energy and the stresses imparted by the motion of the water waves.

According to one embodiment of the present invention, the floating platform includes a buoyancy vessel floating on the water and having dimensions and weight sufficient to provide buoyancy to the floating breakwater structure.

According to another embodiment of the present invention, the floating structure includes a deck disposed above the water surface. The deck has a desired payload for industrial activity and urban life (e.g., promenade, playgrounds, food houses/pubs, shops, and suchlike). The floating structure also includes a floating base disposed under the water surface, and configured for maintaining the deck above the water surface. The floating structure also includes strut elements extending from the float base configured for supporting the deck under the water surface.

According to an embodiment of the present invention, the floating base includes a plurality of removable buoyancy units connected to the deck via the strut elements. Each buoyancy unit includes a pontoon configured to displace enough water in order to create a buoying force greatly in excess of the weight of the buoyancy unit. Location of the buoyancy units is such that an entire volume of the buoyancy units is well below the area of wave action.

According to an embodiment of the present invention, the strut elements have a suitable length to provide sufficient clearance (e.g., in a range of 2 to 7 meters, optionally about 3 meters) over the water surface.

According to an embodiment of the present invention, the damping system includes a set of floating bodies configured to float up and down independently along with the waves on the water surface and at a depth where wave action is most prevalent. The floating bodies are arranged in rows, which are parallel to at least one side of the floating structure. The rows extend apart from said one side, along the direction of the incoming waves. Each row includes a plurality of floating bodies. In each row, the floating bodies are shifted with respect to the floating bodies of the neighboring rows to provide shielding of said one side from direct impact of the incoming waves.

According to an embodiment of the present invention, the damping system includes levers associated with the floating bodies and a rotary shaft arranged on the breakwater structure. The floating bodies are connected to the rotary shaft by the levers. Each lever has a suitable shape to be connected to the corresponding floating body at one end of the lever and to the rotary shaft at its other end, thereby to provide pivotal motion along an axis of the rotary shaft.

According to an embodiment of the present invention, the floating bodies have a cylindrical shape, however other shapes are also contemplated. A cylindrical floating body can have a size in the cross-section area of the cylinder in the range of 0.5 meter to 50 meters and a length of the cylinders in the range of 1 meter to 100 meters. It should be mentioned that cylindrical floating bodies in one row may be varied in their dimensions from the ones in the other row.

According to an embodiment of the present invention, weight of the floating bodies is in the range of 10 kg to 10000 tons.

According to an embodiment of the present invention, the number of the floating bodies in each row is governed by the length of the side, while a number of the rows extending from said one side of the floating structure is governed by the length of the incoming waves. For example, the number of the rows can be in the range of 1 to 6.

According to an embodiment of the present invention, at least one floating body is located on a crest of incoming waves and at least one another floating body is located on a trough of the incoming waves.

The floating breakwater structure can further comprise a resisting mechanism (torque resisting mechanism), coupled to the rotary shaft and configured to apply mechanical resistance to the movement of the floating bodies. According to one embodiment, the torque resisting mechanism is adapted to controllably damp wave energy of waves having height level that is equal or greater than a defined height level, to thereby permit passage of waves having height levels smaller than the define height level. Height level of a wave can be measured as the distance between the highest and lowest points of the wave.

According to an embodiment, the system includes a generator operatively coupled to the rotary shaft in some embodiments, and used to generate electrical energy from the rotary movement transferred thereto from the floating bodies.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
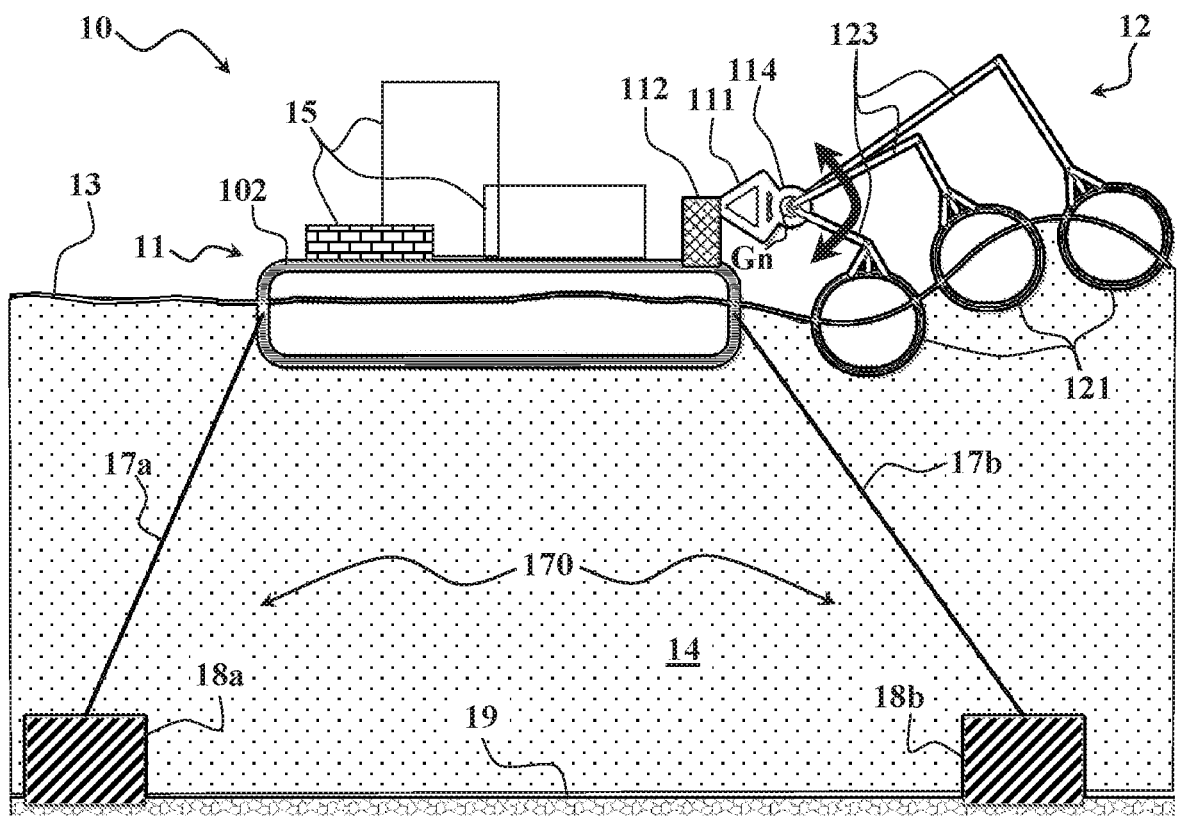
FIG. 1 illustrates a side view of a floating breakwater structure disposed at a water surface, according to one embodiment of the present invention.

The principles and operation of the floating breakwater structure according to the present invention may be better understood with reference to the drawings and the accompanying description, it being understood that these drawings and examples in the description are given for illustrative purposes only and are not meant to be limiting. It is to be understood that these drawings, which are not necessarily to scale, are given for illustrative purposes only and are not intended to limit the scope of the invention. For example, the dimensions of some of the elements in the figures may be exaggerated relative to other elements to help improve understanding of various embodiments. The same reference numerals and alphabetic characters will be utilized for identifying those components which are common in the floating structure and its components shown in the drawings throughout the present description of the invention.

Figure 2:
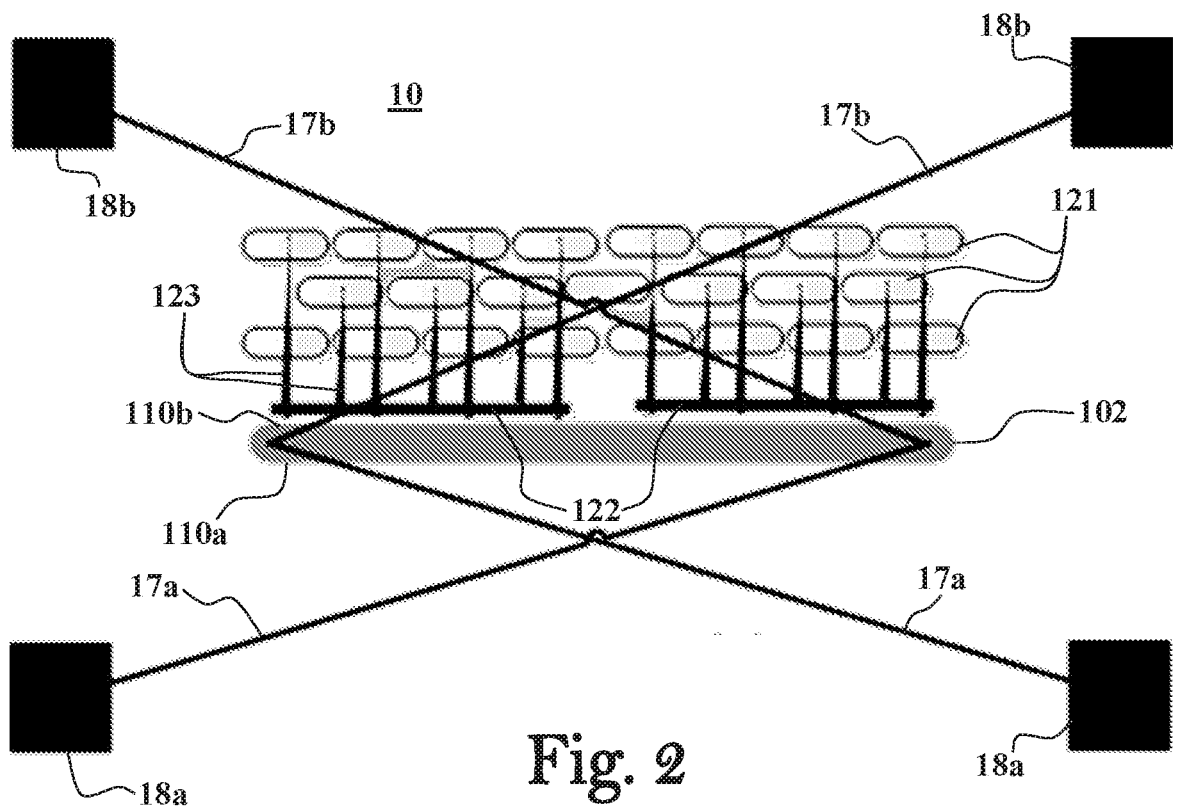
FIG. 2 illustrates a top view of the floating structure shown in FIG. 1.

Referring to FIGS. 1 and 2 together, a side view and a top view of a floating breakwater structure 10 disposed at a water surface 13 of a water body (such as oceans, sea or lakes) 14 are illustrated, according to an embodiment of the present invention. The floating breakwater structure 10 includes a floating platform 11 and a mooring system 170. The floating platform 11 is disposed at a water surface and configured for being mounted offshore at a predetermined distance from a shoreline (not shown in FIGS. 1 and 2).

According to the embodiment shown in FIGS. 1 and 2, the floating platform 11 includes a buoyancy vessel 102 floating on the water. The buoyancy vessel 102 has dimensions and weight sufficient to provide buoyancy to the floating breakwater structure 10.

For example, the buoyancy vessel 102 can be constructed from lightweight pre-stressed and post tensioned concrete. It could be also designed and constructed from fiberglass or any other suitable material.

When desired, the buoyancy vessel 102 may be configured to have a hollow body and include a chamber filled with a filler material. The filler material may include concrete, polymeric materials/foams, pebbles, glass, ceramics, sand, water and so forth. When desired, the hollow body of the buoyancy vessel 102 can be adapted to contain air or any suitable gaseous material.

According to the embodiment shown in FIGS. 1 and 2, the buoyancy vessel 102 of the floating platform 11 is a single unit. However, when desired, the floating platform 11 can include a chain of several buoyancy vessels 102 connected to each other. Such connection may be a rigid or flexible between two consecutive buoyancy vessels or/and floating platforms.

According to the embodiment shown in FIGS. 1 and 2, the outline of the floating platform 11 is rectangular, however other outline shapes are also contemplated. A length of the rectangular floating platform 11 can be many times greater than a width. For example, the length in the range of 50 meters to 2000 meters and width in the range of 10 meters to 500 meters, however other outline dimensions are also contemplated.

In operation, when floating platform 11 is rectangular, it has two long sides and two short sides. Hereinafter, a long side 110a of the floating platform 11 that is mounted along a coast line and which faces a shore is referred to as a posterior long side, while another long side 110b that faces a sea-horizon is referred to as a long anterior side.

The mooring system 170 includes at least one pair of side anchors 18a which are at the posterior side of the floating platform 11, and at least another pair of side anchors 18b which are at the anterior side of the of the floating platform 11. The side anchors 18a are referred to as posterior side anchors, while the side anchors 18b are referred to as anterior side anchors. The side anchors 18a and 18b are located on the seabed 19.

The mooring system 170 also includes at least one pair of mooring spring-lines 17a corresponding to the posterior side anchors 18a, and at least another pair of mooring spring-lines 17b corresponding to the anterior side anchors 18b. The mooring spring-lines 17a and 17b of the first and second pairs, correspondingly, run diagonally and cross each other at angles which should be enough to limit the fore-and-aft movement of the floating breakwater structure 10.

The crossing mooring spring-lines 17a and 17b are linked to the buoyancy vessel 102 of the buoyancy platform 11 via corresponding fairleads (not shown) arranged on the rectangular buoyancy platform 11. The crossing mooring spring-lines 17a and 17b are configured for anchoring the floating breakwater structure 10 to the seabed 19 by the side anchors 18a and 18b, correspondingly.

As shown in FIG. 2, one pair of crossing mooring spring-lines 17b connects the anterior long side 110b to the corresponding anterior side anchors 18b, while another pair of crossing mooring spring-lines 17a connects the posterior long side 110a to the corresponding posterior side anchors 18a. In this example, the mooring spring-lines 17a and 17b are connected to short sides of the rectangular buoyancy platform 11, however, other connection points are also contemplated.

In operation, the floating breakwater structure 10 can be moored at a chosen orientation with respect to the shoreline (not shown in FIGS. 1 and 2), thereby making it possible to reduce the six degrees of freedom motions exhibited by the floating breakwater structure (surge, sway, heave, roll, pitch and yaw) as well as to mitigate the forces of steady drift due to wave reflection, while providing the breakwater structure a desired degree of freedom to surge, sway and/or heave motions in response to changes of water level, water streams, waves and/or wind.

It should be understood that the posterior side anchors 18a and the anterior side anchors 18b may be implemented in different ways, depending on the conditions at the location of the anchor points, such as the wind, stream flow, sea floor structure, etc. The type of the posterior and anterior side anchors 18a and 18b depends on the type of the floating breakwater structure 10, its weight, dimensions, etc. The side anchors 18a and 18b can, for example, include gravity anchors, in which the weight of the anchor itself can keep it in place, drag-type anchors, suction bucket anchors, and/or pile-driven anchors.

According to the embodiments shown in FIGS. 1 and 2, the floating breakwater structure 10 includes a damping system 12 which is arranged at one side of the floating platform 11. The damping system 12 is arranged at the anterior long side 110b of the floating platform 11. The damping system 12 is configured for breaking waves in order to stabilize a horizontal (and/or geographical) position of the floating breakwater structure 10, and to absorb the wave energy and the stresses imparted by the motion of the waves.

According to an embodiment of the present invention, the damping system 12 includes a set of floating bodies 121, which are configured to float up and down independently along with the waves on the water surface and at a depth where wave action is most prevalent.

The floating bodies 121 are arranged in rows, which are parallel to the anterior long side 110b. The rows extend apart from the anterior long side 110b in a perpendicular direction. Each row includes a plurality of floating bodies 121. In each row, the floating bodies 121 are shifted with respect to the floating bodies 121 of the neighboring rows to provide shielding of the anterior long side 110b from direct impact of the incoming waves. The floating bodies 121 are connected to a rotary shaft 122 arranged on the floating platform 11 by using levers 123. Each lever 123 has a suitable shape in order to be connected to the corresponding floating body 121 at one end of the lever 123 and to the rotary shaft 122 at its other end to provide pivotal motion along an axis of the rotary shaft 122.

According to an embodiment of the present invention, the pivoted levers 123 are operatively coupled to a resisting mechanism 111 (e.g., torque resisting mechanism), configured to apply defined resistance to upward and/or downward motion of the floating bodies 121, and thereby define damping properties and/or wave-height (e.g., for permitting shallow waves to pass undamped) of the breakwater platform 10. The resisting mechanism 111 can be implemented by application of friction forces over the rotary shaft 122 e.g., utilizing a type of belt strap wrench mechanism that can be controllably tightened or released its grip over the rotary shaft 122.

According to an embodiment of the present invention, each floating body 121 is independent from the others and includes a pontoon configured to displace enough water in order to create a buoying force. If any of these floating bodies 121 are damaged or become defective, the defective bodies can be readily repaired or replaced. This configuration can, for example, be achieved by construction of the buoyancy bodies from pre-stressed and post tensioned concrete; however it could be also designed and constructed in steel or, for smaller scale structures, from fiberglass or any other suitable material. When desired, the pontoons of the floating bodies 121 may be configured to have a hollow body to provide sufficient buoyancy thereof.

The size, shape and weight of the floating bodies 121 are governed by the condition to absorb maximum energy of the striking waves. For example, the floating bodies 121 can have a cylindrical shape with a diameter in the cross-section area of the cylinder in the range of 1 meter to 20 meters and a length of the cylinders in the range of 1 meter to 10 meters.

The weight of the floating bodies 121 should be sufficient for absorbing the energy of the strong waves by transferring it in the potential energy of the floating bodies 121 when they are lifted up. For example, the weight of the floating bodies 121 can be in the range of 10 kg and 100 tons.

The number the floating bodies 121 in each row is governed by the length of the long side 110b of the floating platform. In turn, the number of the rows extending from the side 110b is governed by the length and form of the incoming waves. This number should be sufficient to provide desired shielding and stabilization of the floating breakwater structure 10. For example, the number of the rows can be in the range of 1 to 6, while the number of the floating bodies 121 in the rows can be in the range of 1 to 1000.

Moreover, in order to achieve a maximal efficiency of operation of the damping system 12 during a storm and harsh weather conditions, the floating bodies 121 of at least one or more rows should be located on the crests of the incoming waves and the floating bodies 121 of at least one or more rows should be located on the troughs of the incoming waves. For example, for waves with a wavelength in the range of 10 meters to 20 meters, this provision can be achieved when the number of the rows is in the range of 1 to 6.

Figure 3:
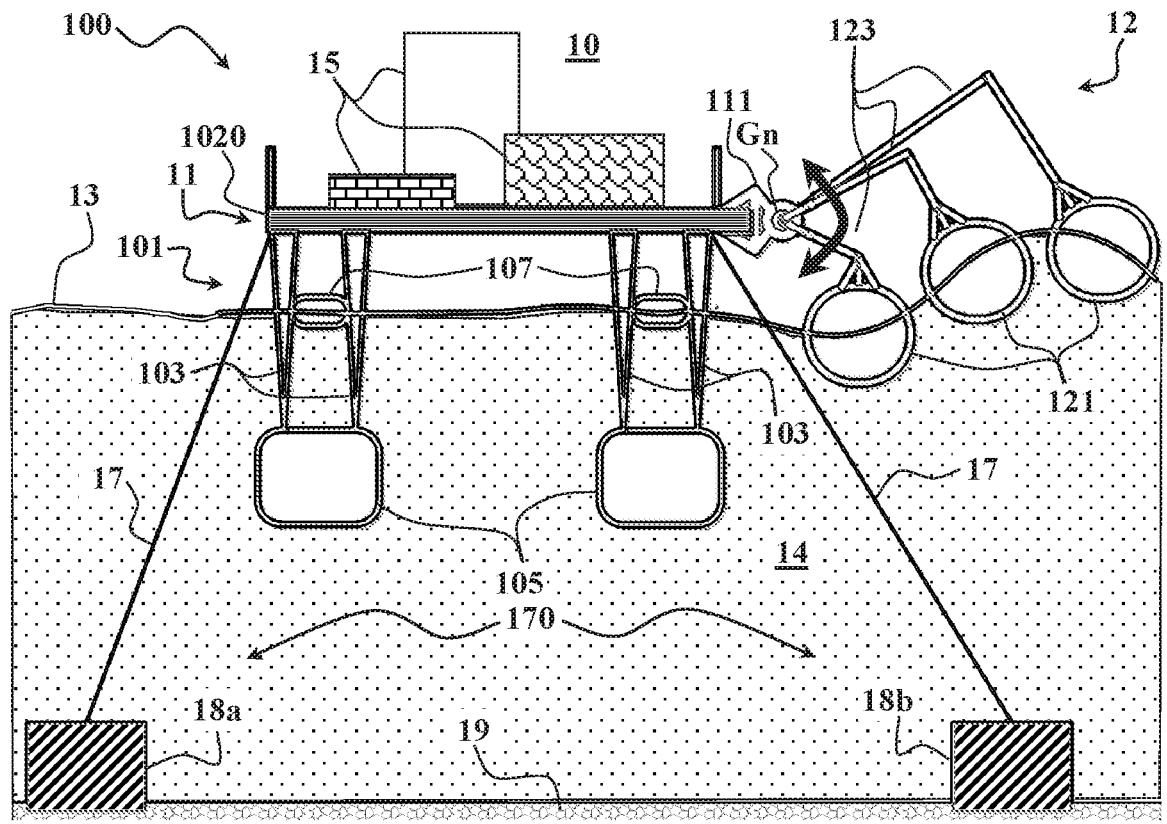
FIG. 3 illustrates a side view of a floating breakwater structure disposed above water surface, according to another embodiment of the present invention.

Referring to FIG. 3, a side view of a floating breakwater structure 100 disposed at a water surface 13 of a water body (such as oceans, sea or lakes) 14 is illustrated, according to another embodiment of the present invention. According to this embodiment, the floating platform 11 is a semi-submersible platform that includes a floating base 101 disposed under the water surface 13 and a deck 1020 supported by strut elements 103.

The floating base 101 is disposed mainly under the water surface 13 and configured for holding the deck 1020 and a desired payload (e.g., equipment and facilities) 15, which is mounted on the deck 1020 for industrial activity and/or urban life.

According to an embodiment of the present invention, the floating base 101 includes a plurality of buoyancy pontoons 105 and a plurality of balance pontoons 107 arranged above the of buoyancy pontoons 105. It should be noted that although two buoyancy pontoons 105 and two plurality of balance pontoons 107 are shown in FIG. 3, generally, any desired number of the buoyancy pontoons 105 and the balance pontoons 107 can be used. The buoyancy pontoons 105 and the balance pontoons 107 are connected to the deck 102 via common strut elements 103. Each buoyancy pontoon 105 is configured to displace enough water in order to create a buoying force greatly in excess of weight of the buoyancy pontoon. In particular, the buoyancy pontoons 105 provide 50-100% of buoyancy to the floating breakwater structure 100. The balance pontoons 107 are configured to provide stabilization and correspondingly 0-50% of buoyancy to the floating breakwater structure 100.

If any of these buoyancy pontoons 105 and/or balance pontoons 107 are damaged or become defective, the defective units can be readily repaired or replaced. This configuration can, for example, be achieved by construction of the buoyancy pontoons 105 and the balance pontoons 107 from lightweight pre-stressed and post tensioned concrete; however it could be also designed and constructed in steel or, for smaller scale structures, from fiberglass or any other suitable material.

When desired, the buoyancy pontoons 105 and the balance pontoons 107 may be configured to have a hollow body filled with a filler material to provide sufficient weight therefor. The filler material may include metals, concrete, polymeric materials/foams, nontoxic construction disposals such as bricks, rocks, pebbles, glass, ceramics, sand and so forth.

The size, shape and weight of the buoyancy pontoons 105 and the balance pontoons 107 are governed by the size, shape and weight of the deck 102 and equipment being supported on the deck. For example, size of the buoyancy units 105 can be in the range of 1 meter to 100 meters and weight in the range of 10 kg and 1000 tons. Size of the balance pontoons 107 can be in the range of 1 meter to 50 meters and weight in the range of 10 kg to 5000 kg.

The number and concentration of the buoyancy pontoons 105 and the balance pontoons 107 arranged above the buoyancy pontoons 105 is preferably such that the entire volume of the buoyancy pontoons 105 are well below the area of wave action, e.g. at a depth below the water surface of about 5 meters to 20 meters, while the balance pontoons 107 are at the water surface 13.

The strut elements 103 can be made of a suitable material and have a required configuration and cross-section area to provide a suitable strength in order to maintain the deck 1020 with a desired industrial and urban infrastructure. For example, the strut elements 103 can be formed from steel tubes, concrete columns, etc. The number and concentration of the strut elements are governed by the size and weight of the deck 1020 and equipment being supported. Preferably, the strut elements 103 have a suitable length to provide sufficient clearance over the water surface 13 to meet the requirement that relatively small waves with a height of less than about 5 meters do not reach the deck 1020 or at least do not effectively disturb operation of the equipment and facilities mounted on the deck. When desired, the strut elements 103 may be implemented in form of hollow pipes to provide additional buoyancy to the structure.

In this embodiment, the buoyant floating base 101 of the rectangular floating platform 11 is well below the surface wave action. On the other hand, the deck 1020 of the rectangular floating platform 11 is well above the energy of the wave action. The only portion of the platform components subject to the forces of wave action is a narrow segment of the pipes or columns of the strut elements 103 that provide support to the deck 102, and the balance pontoons 107 that provide stabilization of the floating breakwater structure 100. This portion is small relative to the total areas of the floating base 101 and the deck 1020.

As shown in FIG. 3, the floating structure 100 also includes the mooring system 170, and the damping system 12 arranged at one side of the floating platform 11. The mooring system 170 and the damping system 12 in the embodiment shown in FIG. 3 are similar to the mooring system 170 and the damping system 12 of the floating structure 10 in (FIGS. 1 and 2), which are described hereinabove.

Referring to FIGS. 1 and 3 together, the damping system 12 of the floating breakwater structures (10 in FIG. 1) and (100 in FIG. 3) can also be used for converting the energy of the striking waves into usable energy onboard. According to an embodiment, the floating breakwater structures (10 in FIG. 1) and (100 in FIG. 3) can include a turbine (not shown) actuated by displacement of the pivoted levers 123 and directly connected to a generator Gn for producing electricity to be used online or stored in electrical batteries.

Figure 4:
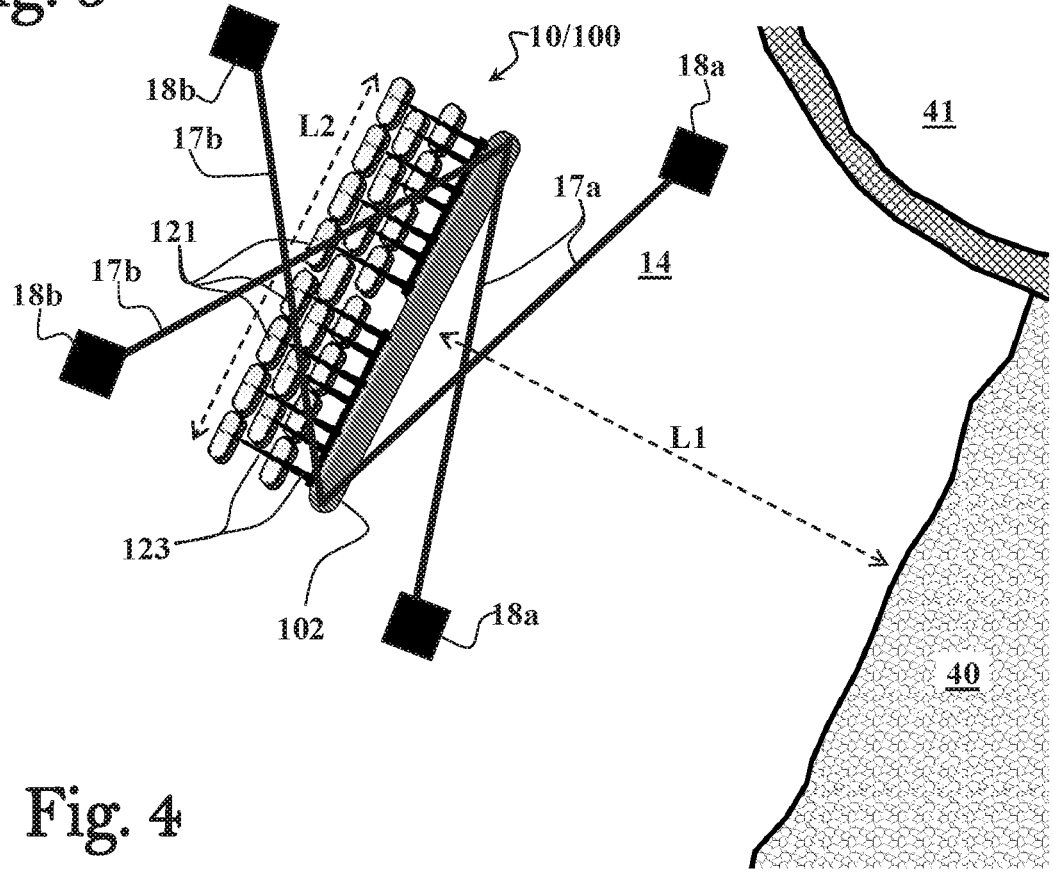
FIG. 4 illustrates a breakwater implemented by a floating breakwater structure, according to embodiment of the present invention, installed at a predetermined distance from a shore.

Referring to FIG. 4, a floating breakwater structure 10, 100 is shown, according to some embodiments of the invention, which are installed at some predefined distance from, and substantially parallel to a seashore line 40. In this specific and non-limiting example, the floating breakwater structure 10, 100 is located adjacent to a fixed breakwater/ pier of a maritime structure, such as port 41, but it is not linked in any way to such maritime structures, and can be similarly located remote to it, or in any other suitable location in the water body 14.

The floating breakwater structure 10, 100 can be used to enforce low wave levels, or substantially no-waves, conditions over some portion of the coastline 40 facing it, to thereby create convenient water conditions for swimming and/or any other water activities. The floating breakwater structure 10/100 can be also used to generate electricity, or serve as a pier for anchoring boats or other water vessels/ crafts, and/or to control heights of waves between the floating breakwater structure 10, 100 and the coastline 40, e.g., for any water activity, such as, swimming, diving, SAP, surfing etc. The length L2 of the floating breakwater structure 10, 100 can be thus selected according to the various different uses.

Figure 5:
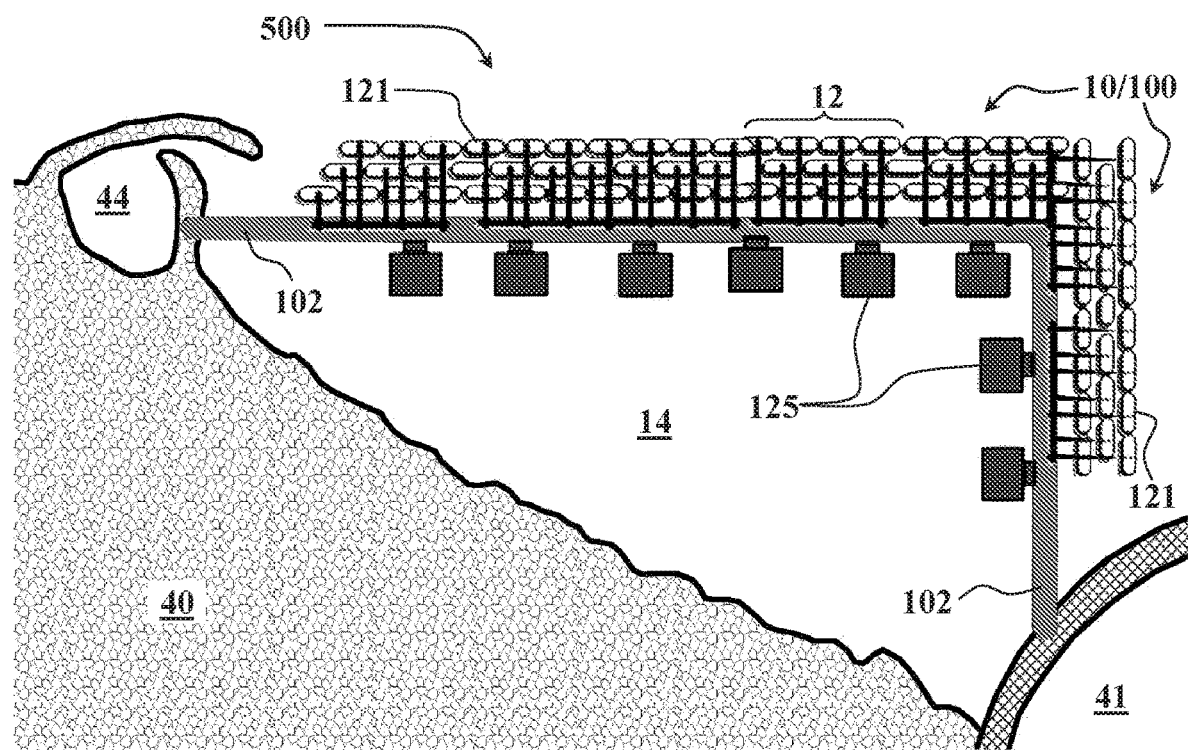
FIG. 5 illustrates a breakwater configuration implemented by floating breakwater structure, according to embodiments of the present invention, with linkage to one or more fixed maritime structures.

Referring to FIG. 5, a breakwater system 500 utilizing floating breakwater structures 10/100 of the present invention is illustrated, which is installed in the water body 14 with some linkage to the shore for allowing passage of pedestrians and/or small vehicles (e.g., bicycles, motorcycles, and suchlike) thereover. For example, the breakwater system 500 can be constructed to form a promenade mechanically linked at one or more ends thereof to other maritime structures e.g., fixed breakwater/pier of marina 44 and/or of port 41.

In this specific and non-limiting example breakwater system 500 comprises two elongated buoyancy vessels 102 (or decks 1020, as shown in FIG. 3), each having one or more damping systems 12, mooring system 170 (not shown in FIG. 5), and other possible components, which may be implemented using any of the embodiments disclosed herein, or any combination thereof. As shown in FIG. 5, the buoyancy vessels 102 forms a right-angled structure connected at one free end thereof to a fixed breakwater/pier of the marina 44, and at its other free end to a fixed breakwater/pier of the port 41. This way, wave properties within a portion of the water body 14 enclosed by the breakwater system 500 can be substantially controlled by the damping systems 12 to provide a desired low wave level for swimmers (e.g., 10 to 70 cm), or greater wave levels for other activities, such as surfing (e.g., 50 to 150 cm).

Each of the buoyancy vessels 102 (or decks 1020 in FIG. 3) of the breakwater system 500 can have one or more facilities platforms 125 attached to posterior sides of the elongated buoyancy vessels 102, that may be configured to hold human activities facilities such as but not limited to, playgrounds, food houses/pubs, shops, and suchlike. When desired, each of the facilities platforms 125 can have separate supporting buoyancy pontoons (not shown). As in previously described embodiments, the damping systems 12 can be used to generate electricity from the wave energy, which may be directly supplied to the different facilities provided on each platform 125.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It should be understood that the features of the invention are not bound to any particular application of the floating breakwater structure, and are equally applicable to any large-scale floating platforms.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A floating breakwater structure, comprising:
   a floating platform disposed at a water surface and configured for being mounted offshore at a predetermined distance from a shoreline, the floating platform having one long side for facing a shore and another long side for facing a sea-horizon;
   a mooring system comprising:
      at least one pair of side anchors located on the seabed at one long side of the floating platform, and at least one another pair of side anchors located on the seabed at the other long side of the floating platform;
      at least two pairs of crossing mooring spring-lines linked at one end to the floating platform, each pair of the crossing mooring spring-lines linked at one end to the corresponding long side of the of the floating platform and at another end to the corresponding pair of the side anchors, thereby anchoring the floating breakwater structure to the seabed; and
   a damping system arranged at any one of the long sides of the floating platform and configured for breaking waves in order to stabilize the floating breakwater structure, and to absorb the wave energy and the stresses imparted by the motion of the waves;
   wherein the damping system includes a set of floating bodies configured to float up and down independently along with the waves on the water surface and at a depth where wave action is most prevalent, the floating bodies arranged in rows along the long side of the floating structure at which the damping system is arranged and extend apart from said long side, each row including a plurality of floating bodies which are adjacent to each other in each row in a corresponding line parallel to said long side, so as to provide shielding of said long side from direct impact of the incoming waves.

2. The floating breakwater structure of claim 1, wherein the floating platform includes a buoyancy vessel floating on the water and having dimensions and weight sufficient to provide buoyancy to the floating breakwater structure.

3. The floating breakwater structure of claim 1, wherein the floating platform includes:
   a deck disposed above the water surface and having a desired payload;
   a floating base disposed under the water surface, and configured for holding the deck; and
   strut elements extending from the floating base and configured for supporting the deck.

4. The floating breakwater structure of claim 3, wherein the strut elements have a suitable length to provide sufficient clearance over the water surface to meet the requirement that waves with a height of less than about 5 meters do not reach the deck.

5. The floating breakwater structure of claim 1, wherein, in each row, the floating bodies are shifted with respect to the floating bodies of the neighboring rows to provide shielding of said one side from direct impact of the incoming waves.

6. The floating breakwater structure of claim 1, wherein the damping system includes levers associated with the floating bodies and a rotary shaft arranged on the floating platform, wherein the floating bodies are connected to the rotary shaft by using the levers, each lever having a suitable shape to be connected to the corresponding floating body at one end of the lever and to the rotary shaft at its other end, thereby to provide pivotal motion along an axis of the rotary shaft.

7. The floating breakwater structure of claim 6 comprising a resisting mechanism configured and arranged to resist movement of the floating bodies.

8. The floating breakwater structure of claim 6 comprising a generator operatively coupled to the rotary shaft, and configured to generate electrical energy from the rotary movement transferred thereto from the floating bodies.

9. The floating breakwater structure of claim 1, wherein the floating bodies have a cylindrical shape with a diameter in the cross-section area of the cylinder in the range of 0.5 meter to 50 meters and a length of the cylinders in the range of 1 meter to 10 meters.

10. The floating breakwater structure of claim 1, wherein during operation at least one floating body is located on a crest of incoming waves and at least one another floating body is located on troughs of the incoming waves.

11. The floating breakwater structure of claim 1, wherein a number of the floating bodies in each of the rows is more than 1.

12. A floating breakwater structure, comprising:
   a floating platform disposed at a water surface and configured for being mounted offshore at a predetermined distance from a shoreline, the floating platform having one long side for facing a shore and another long side for facing a sea-horizon;
   a mooring system including:
      at least one pair of side anchors located on the seabed at one long side of the floating platform, and at least one another pair of side anchors located on the seabed at the other long side of the floating platform;
      at least two pairs of crossing mooring spring-lines linked at one end to the floating platform, each pair of the crossing mooring spring-lines linked at one end to the corresponding long side of the of the floating platform and at another end to the corresponding pair of the side anchors, thereby anchoring the floating breakwater structure to the seabed; and
   a damping system arranged at any one of the long sides of the floating platform and configured for breaking waves in order to stabilize the floating breakwater structure, and to absorb the wave energy and the stresses imparted by the motion of the waves;
   wherein the floating platform includes:
      a deck disposed above the water surface and having a desired payload;
      a floating base disposed under the water surface, and configured for holding the deck; and
      strut elements extending from the floating base and configured for supporting the deck:
   wherein the floating base includes:
      a plurality of buoyancy pontoons configured to displace enough water in order to create a buoying force greatly in excess of the weight of the buoyancy pontoons; and
      a plurality of balance pontoons arranged above the buoyancy pontoons and configured to provide stabilization of the floatable breakwater structure on the water surface; said plurality of buoyancy pontoons and said plurality of balance pontoons connected to the deck via the strut elements.

13. The floating breakwater structure of claim 12, wherein a number and a concentration of the buoyancy pontoons and the balance pontoons is such that an entire volume of the buoyancy units is well below the area of wave action, while the balance pontoons are at the water surface.

\* \* \* \* \*